(12) United States Patent
Inkinen

(10) Patent No.: US 7,451,153 B2
(45) Date of Patent: Nov. 11, 2008

(54) METHOD AND APPARATUS FOR SYMMETRICAL FILENAME ENCODING

(75) Inventor: Mikko P. Inkinen, Märynummi (FI)

(73) Assignee: Nokia Corporation, Espoo (FI)

( * ) Notice: Subject to any disclaimer, the term of this patent is extended or adjusted under 35 U.S.C. 154(b) by 443 days.

(21) Appl. No.: 10/765,723

(22) Filed: Jan. 26, 2004

(65) Prior Publication Data

US 2005/0165721 A1 Jul. 28, 2005

(51) Int. Cl.
G06F 7/00 (2006.01)

(52) U.S. Cl. .................................. 707/100; 707/103 R

(58) Field of Classification Search ................ 709/206, 709/245, 246; 707/4, 100, 101, 200, 5, 9, 707/10, 102, 103 R
See application file for complete search history.

(56) References Cited

U.S. PATENT DOCUMENTS

| | | | | |
|---|---|---|---|---|
| 5,444,445 | A * | 8/1995 | Chu | 341/87 |
| 5,579,517 | A | 11/1996 | Reynolds et al. | 707/200 |
| 5,745,902 | A | 4/1998 | Miller et al. | 707/200 |
| 5,758,352 | A | 5/1998 | Reynolds et al. | 707/200 |
| 5,794,230 | A | 8/1998 | Horadan et al. | 707/2 |
| 6,260,043 | B1 | 7/2001 | Puri et al. | 707/101 |
| 6,286,013 | B1 | 9/2001 | Reynolds et al. | 707/200 |
| 7,047,420 | B2 * | 5/2006 | Douceur et al. | 713/190 |
| 7,165,239 | B2 * | 1/2007 | Hejlsberg et al. | 717/114 |
| 2001/0011221 | A1 * | 8/2001 | Underwood | 705/1 |
| 2003/0009480 | A1 | 1/2003 | Lin et al. | 707/200 |
| 2003/0009747 | A1 | 1/2003 | Duran | 717/137 |
| 2003/0208743 | A1 * | 11/2003 | Chong et al. | 717/106 |
| 2004/0044791 | A1 * | 3/2004 | Pouzzner | 709/245 |
| 2004/0088153 | A1 * | 5/2004 | Perrin et al. | 703/26 |
| 2004/0177159 | A1 * | 9/2004 | Butterfield et al. | 709/246 |
| 2005/0049997 | A1 * | 3/2005 | Shipp | 707/1 |

FOREIGN PATENT DOCUMENTS

EP 1 028 372 A1 8/2000
WO WO 01/39043 A2 5/2001

OTHER PUBLICATIONS

FileFormat. Infor, "Unicode Character".*
Online Wikipedia, "Mapping of Unicode characters".*
Free Online Unicode Character Map.*
FileFormat. Infor. "Unicode Character".*
Online Wikipedia, "Mapping of Unicode Characters".*
Free Online Unicode Character map.*
Microsoft Press, Computer Dictionary, pp. 31, 507, 508, 520, 521. (1997).*

* cited by examiner

Primary Examiner—Wilson Lee

(57) ABSTRACT

The invention provides a method and apparatus for encoding a filename having an illegal character. The method features the step of encoding the filename by replacing the illegal character with a specific code character. The apparatus features an encoder module for a mobile terminal or other suitable device that encodes the filename by replacing the illegal character with the specific code character. The invention also features a decoder module for decoding an encoded filename by replacing the specific code character with the illegal character, whereby the filename is decoded back to the original format.

17 Claims, 1 Drawing Sheet

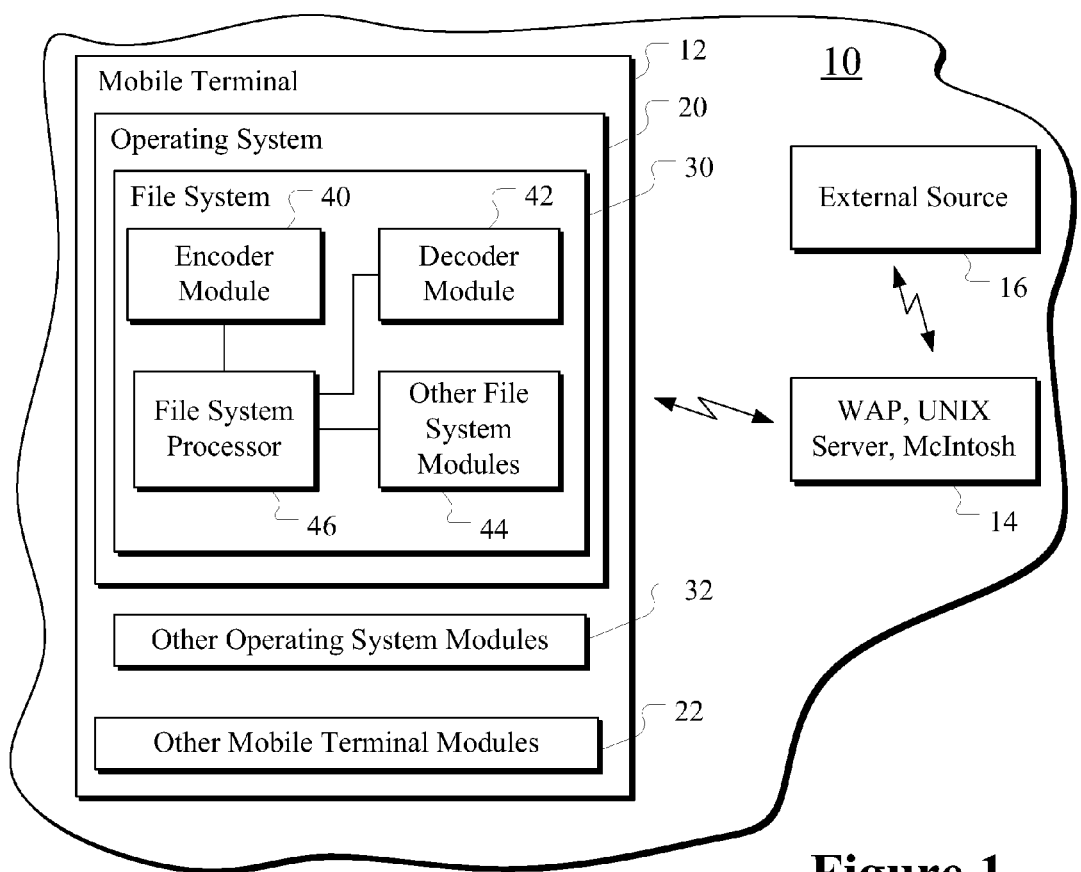
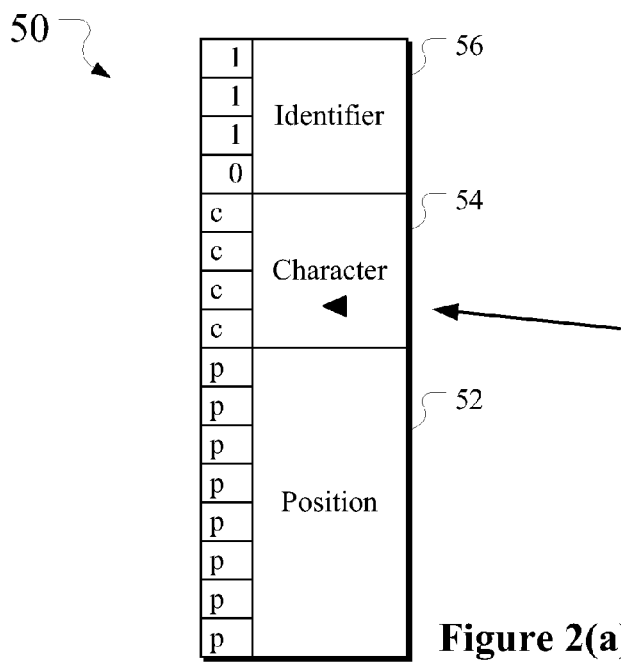
Figure 2: Simple symmetrical Encoding example

METHOD AND APPARATUS FOR SYMMETRICAL FILENAME ENCODING

BACKGROUND OF THE INVENTION

1. Field of Invention

This invention relates to a device and method for encoding a filename having an illegal character; and more particularly relates to a device and method for encoding a filename having an illegal character in a mobile terminal operating in a wireless network.

2. Description of Related Art

In the prior art, there are known protocols for naming files with filenames. However, under some protocols certain sets of characters cannot be used in filenames, such as "/" (left slash), "\" (right slash), ":" (colon), "*" (asterisk), """ (double quote), "<" (less than), ">" (greater than), etc. A typical device known in the art would include an operating system having a file system with a filename program for detecting filenames having illegal characters and taking suitable action in relation to the same. The file system is a software component that is responsible for managing the files in the operating system. A typical filename with legal characters can be for example "picture.jpg".

In one known file system, it is not possible to use a specific set of characters that includes the question mark '?' in a filename to name or identify a file. Since the set of illegal characters is only specific to certain file systems, other systems can create files with illegal names. If an illegally named file is received from another device, the file will typically be rejected in the receiving device due to the illegal name. If the illegal name is simply converted to legal one, the illegal characters in the illegal name will be lost. If the illegal characters were important to some other file system, the file is permanently corrupted and cannot necessarily be handled in the external device anymore.

Known solutions reject illegal filenames thus reducing the range of possible files that could be saved to the file system.

The present invention provides a way to manage files having filenames with illegal characters received from external devices.

SUMMARY OF INVENTION

In its broadest sense, the present invention provides a new and unique method and apparatus for encoding a filename having an illegal character. The method features the step of encoding the filename by replacing the illegal character with a specific code character. The apparatus features an encoder module for a mobile terminal or other suitable device that encodes the filename by replacing the illegal character with the specific code character. The invention also features a decoder module for decoding an encoded filename by replacing the specific code character with the illegal character in its proper location, whereby the filename is decoded back to the original format for providing back to the external device.

In effect, the present invention provides a simple symmetrical encoding for filenames to replace each illegal characters with a respective specific code characters.

Typically, filenames use 16 bit Unicode characters so there is 16 bits to encode one illegal character. According to the present invention, the encoder represents the position of the illegal character in the filename with 8 bits (2^8=256) and maps the illegal character itself using four bits that represent the Unicode character.

According to the present invention, the encoder also identifies the specific code character from other characters somehow by using the four most significant bits (MSB) as an illegal character indicator, e.g. using the Unicode designation "1110=E". In the Unicode standard, code areas from E000 to F8FF are reserved for private or internal business use, and available for use as such an indicator.

In one embodiment, the specific code character can be placed at the end of the filename, before the commonly used filename extension. For example, this would make an illegal filename "ale?x.jpg" look like "alex .jpg", where the blank space represents the coded character.

One advantage of the present invention is that the solution makes it possible to receive files, containing illegal characters, from an external source connected to the mobile terminal through WAP, UNIX Server or McIntosh and store the files into the file system without corrupting the filenames. The solution also makes it possible to decode the filenames back to the original format, recreating the illegal characters.

Another important advantage of the present invention is the fact that the mobile terminal can be used as a mass storage device for popular Apple McIntosh operating system even though the file system in mobile does not directly support the MacOS operating system.

BRIEF DESCRIPTION OF THE DRAWING

The drawing, not drawn to scale, includes the following Figures:

FIG. 1 is a diagram of a network having a mobile terminal operating therein according to the present invention.

FIG. 2 is a diagram of a simple symmetrical enclosing example according to the present invention, including FIG. 2(a) which shows an encoded character and FIG. 2(b) which shows an example of a table of illegal characters that cannot be used in filenames according to a given protocol.

DETAILED DESCRIPTION OF INVENTION

FIG. 1 shows a network generally indicated as 10 having a mobile terminal 12 coupled, for example, via a WAP, UNIX server or McIntosh generally indicated as 14 to an external source 16. The scope of the invention is intended to include other communication methods or systems. By way of example, the network 10 may include a wireless network having many other elements not shown because they do not form part of the invention. The scope of the invention is not intended to be limited by the type or kind of network in which the invention is implemented. The mobile terminal 12 includes an operating system 20 having a file system 30 for detecting one or more filenames with an illegal character. The file system 30 features an encoder module 40 for encoding the filename by replacing the illegal character with a specific code character.

For example, during the course of operation, the mobile terminal 12 may from time to time receive a file containing one or more illegal characters via the WAP, UNIX server or McIntosh 14 from the external source 16 or other such source. For instance, according to a known filename protocol, the filename "ale?x.jpg" would be considered to contain an illegal character in the form of a question mark "?", which cannot be used to name a file. According to present invention, the filename containing the illegal character would be encoded by replacing the illegal character with the specific code character. In particular, the illegal filename "ale?x.jpg" is encoded to look like "alex .jpg", where the blank space represents the coded character.

The replacement of the illegal character involves using a simple solution taking advantage of the fact that filenames use 16 bit Unicode characters so there are 16 bits available to encode one illegal character.

FIG. 2 shows a simple symmetrical encoding example consisting of a 16-bit specific coded character generally indicated as 50 shown in FIG. 2(a) and a character encoding table 60 shown in FIG. 2(b). It is important to note that the number of bits 16 is just an example, the invention could also be used for 32bit character filenaming. The principle is still the same. So the exact number of bits is not so important but the main idea is that a single character is replaced by a code character that knows how to restore the original illegal character back. So no extra coding information will be written anywhere in the file system, all coding is within the filename itself.

According to the invention, the encoder module 40 represents the position of the illegal character in the filename using 8 of the 16 bits ($2^8=256$) in the position field 52. It is important to note that the scope of the invention is not intended to be limited to using exactly 8 of the 16 bits for encoding the position of the illegal character. For example, embodiment are envisioned using other numbers of bits to encode the position of the illegal character such as 1 to 7 bits.

Next, the encoder module 40 maps the illegal character itself using 4 of the 16 bits to represent the illegal character in the character field 54. In FIG. 2(b), the character encoding table 60 provides a set or list of characters that are illegal and is used for mapping the characters to an integer value. The integer value (0-8 in the example) can be used to map which illegal character is in the code character. As shown there are 9 illegal characters listed in the table 60, although the 4-bit character field 54 would enable 16 different illegal characters to be listed for detection, encoding and replacing.

Further, the encoder module 40 identifies the specific code character from other Unicode characters by using the four most significant bits (MSB) of the 16 bits, e.g. "1110=E", in the identifier field 56. In the Unicode standard, code areas from E000 to F8FF are reserved for private or internal business use.

The scope of the invention is not intended to be limited to the number of specific number of bits allocated to any given field as described above; embodiments are envisioned using different subsets of the 16 bits in the three given fields. For example, an embodiment is envisioned using a 7-bit position field ($2^7=128$) and a 5 bit character field ($2^5=32$), for detecting, encoding and replacing 32 different illegal characters in a filename.

According to the present invention, the specific code character may be placed in a predefined location in the filename, such as at the end of a main portion of the filename before a commonly used extension, or other predefined location.

The Decoder Module 42

In FIG. 1, the file system 30 also includes a decoder module 42 for decoding an encoded filename by replacing the specific code character with the illegal character in its proper location, whereby the filename is decoded back to the original format for providing back to the external device. The decoding process would involve implementing the steps set forth above in the reverse direction to reconstruct the filename having the illegal character in its correct location in the filename.

The Other Modules

As shown in FIG. 1, the operating system 20 also includes other operating system modules 32 that are known in the art and do not form part of the overall invention. The present invention is shown and described herein to form part of known operating systems, including those used for a mobile phone or terminal.

Moreover, the file system 30 also includes other file system modules 44 and a file system processor 46 for controlling the encoder 40, decoder 42, as well as the other file system modules 44. The other file system modules 44 are known in the art, do not form part of the overall invention and are thus not described in detail. The present invention is shown and described herein to form part of known file systems, including those used for a mobile phone or terminal.

Moreover still, the mobile terminal 12 may also include other mobile terminal modules 22 that are known in the art and do not form part of the overall invention, including but not limited to: a signal processor connected to a radio access network module (connected to an antenna), a display module, an audio module, a microphone, a read only memory (ROM or EPROM), a keyboard module, a random access memory, etc. The signal processor typically controls the basic operation of mobile terminal, the operation of which is known in the art. Moreover, the mobile terminal may also include many other circuit elements known in the art which are not shown or described herein, since they do not form part of the immediate invention.

Module and/or Processor Implementations

The encoder module 40 and the decoder module 42, as well as any of the other modules described herein, may be implemented using hardware, software, or a combination thereof. In a typical software implementation, the encoder module 40 and the decoder module 42 would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation.

The scope of the invention is not intended to be limited to any specific kind of mobile terminal, phone or device, and many different mobile terminals or device, including laptop or notebook computers, as well as a desktop computer or any other system that has a file transfer mechanism outside the device itself, are envisioned that may contain the fundamental features of the present invention described herein.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A mobile terminal comprising:
    an operating system having a file system with one or more modules configured for detecting a filename with an illegal character, and for encoding the filename by replacing the illegal character with a specific code character having information coded therein about the illegal character itself, the specific code character comprising an identifier field having information to represent an identifier which is reserved for private use and that is not any character specified in character set standards, a character field having information to represent the illegal character, and a position field having information to represent the position of the illegal character in the filename.

2. A mobile terminal according to claim 1, wherein the position of the illegal character is represented with 8 bits of a Unicode character.

3. A mobile terminal according to claim 1, wherein the illegal characters form part of a specific list or set of characters that are illegal.

4. A mobile terminal according to claim 3, wherein the illegal character itself is mapped using 4 bits of a Unicode character.

5. A mobile terminal according to claim 1, wherein the specific code character includes information to identify the specific code character from other characters.

6. A mobile terminal according to claim 5, wherein coded characters are identified by four most significant bits of the filename, including using code areas from E000 to F8FF in the Unicode character code standard.

7. A mobile terminal according to claim 1, wherein the specific code character is placed in a predefined location in the filename.

8. A mobile terminal according to claim 1, wherein the specific code character is placed at the end of a main portion of the filename before a commonly used extension.

9. A mobile terminal according to claim 1, wherein the file system further comprises a decoder module for decoding an encoded filename by replacing the specific code character with the illegal character, whereby the filename is decoded back to the original format.

10. A mobile terminal according to claim 1, wherein the file system receives filenames from an external source and stores the filenames without corrupting them.

11. A mobile terminal according to claim 10, wherein the file system has a mass storage device for use as a storage device by the external source.

12. A mobile terminal according to claim 1, wherein the filename comprises 16-bit Unicode characters and each specific code character replaces a respective 16-bit Unicode character.

13. A mobile terminal according to claim 12, wherein the specific code character is based on a symmetrical filename coding scheme using substantially all 16 bits of a Unicode character to encode one illegal character.

14. An encoder forming part of a file system of an operating system in a mobile terminal, comprising:
one or more modules configured to encode a filename having an illegal character by replacing the illegal character with a specific code character having information coded therein about the illegal character itself, the specific code character comprising an identifier field having information to represent an identifier which is reserved for private use and that is not any character specified in character set standards, a character field having information to represent the illegal character, and a position field having information to represent the position of the illegal character in the filename.

15. A decoder forming part of a file system of an operating system in a mobile terminal, comprising:
one or more modules configured for decoding an encoded filename, that was encoded by an encoder module by replaced an illegal character in a filename with a specific code character having information coded therein about the illegal character itself, by replacing the specific code character with the illegal character so that the filename is decoded back to the original format, the specific code character comprising an identifier field having information to represent an identifier which is reserved for private use and that is not any character specified in character set standards, a character field having information to represent the illegal character, and a position field having information to represent the position of the illegal character in the filename.

16. A method comprising:
detecting a filename with an illegal character in a file system of an operating system in a mobile terminal: and
encoding the filename by replacing the illegal character with a specific code character having information coded therein about the illegal character itself so as to form an encoded filename, the specific code character comprising an identifier field having information to represent an identifier which is reserved for private use and that is not any character specified in character set standards, a character field having information to represent the illegal character, and a position field having information to represent the position of the illegal character in the filename.

17. Apparatus comprising:
means for detecting a filename with an illegal character in a file system of an operating system in a mobile terminal; and
means for encoding the filename by replacing the illegal character with a specific code character having information coded therein about the illegal character itself, the specific code character comprising an identifier field having information to represent an identifier which is reserved for private use and that is not any character specified in character set standards, a character field having information to represent the illegal character, and a position field having information to represent the position of the illegal character in the filename.

\* \* \* \* \*

UNITED STATES PATENT AND TRADEMARK OFFICE
CERTIFICATE OF CORRECTION

| | |
|---|---|
| PATENT NO. | : 7,451,153 B2 |
| APPLICATION NO. | : 10/765723 |
| DATED | : November 11, 2008 |
| INVENTOR(S) | : Mikko P. Inkinen |

It is certified that error appears in the above-identified patent and that said Letters Patent is hereby corrected as shown below:

On cover page of patent item (75), please change the inventor's city of residence from "Marynummi" to --Salo--.

Signed and Sealed this

Seventeenth Day of February, 2009

JOHN DOLL
*Acting Director of the United States Patent and Trademark Office*